United States Patent [19]

Naumburg et al.

[11] 3,754,564
[45] Aug. 28, 1973

[54] VALVE FOR A CENTRAL SUCTION SYSTEM
[75] Inventors: Per Naumburg, Djursholm; Jan Norrman, Solna, both of Sweden
[73] Assignee: AB Centralsug, Solna, Sweden
[22] Filed: Jan. 3, 1972
[21] Appl. No.: 215,526

[30] Foreign Application Priority Data
Feb. 26, 1971 Sweden.............................. 2520/71

[52] U.S. Cl.............................. 137/360, 251/149.2
[51] Int. Cl............................ F16l 29/00, F16l 5/00
[58] Field of Search...................... 251/149.2, 149.3, 251/149.6, 149.7; 137/360, 361, 362

[56] References Cited
UNITED STATES PATENTS

| | | | |
|---|---|---|---|
| 756,582 | 4/1904 | Chaplin............................ | 251/149.2 |
| 3,468,334 | 9/1969 | Hamrick......................... | 137/360 X |
| 2,601,339 | 6/1952 | Snyder........................ | 251/149.2 X |
| 2,630,131 | 3/1953 | Snyder........................ | 251/149.2 X |
| 2,789,838 | 4/1957 | Palm............................ | 251/149.2 X |
| 3,036,601 | 5/1962 | Fabian et al................. | 251/149.2 X |
| 3,127,148 | 3/1964 | Collar............................ | 251/149.2 |
| 3,580,414 | 5/1971 | Ginsburgh et al. .......... | 251/149.2 X |

Primary Examiner—Alan Cohan
Assistant Examiner—Gerald A. Michalsky
Attorney—George H. Spencer, Harvey Kaye et al.

[57] ABSTRACT

In a system of the type of a central vacuum cleaner system having a plurality of connection boxes for selective connection of suction implements by insertion of a connector in one such box, a normally closed valve disposed within the box. This valve has a valve flap adapted to by swung into opening position within the box by engagement with the connector during insertion thereof. The valve flap has a concave outer surface and at least one shoulder contacting the forward end of the connector at a position spaced from the pivotal point of the flap.

11 Claims, 6 Drawing Figures

PATENTED AUG 28 1973 3,754,564
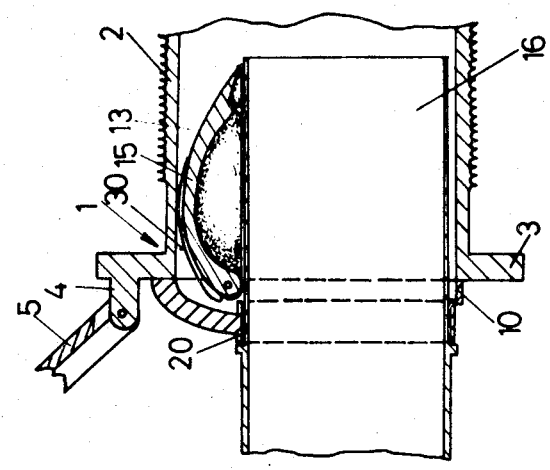
FIG.3
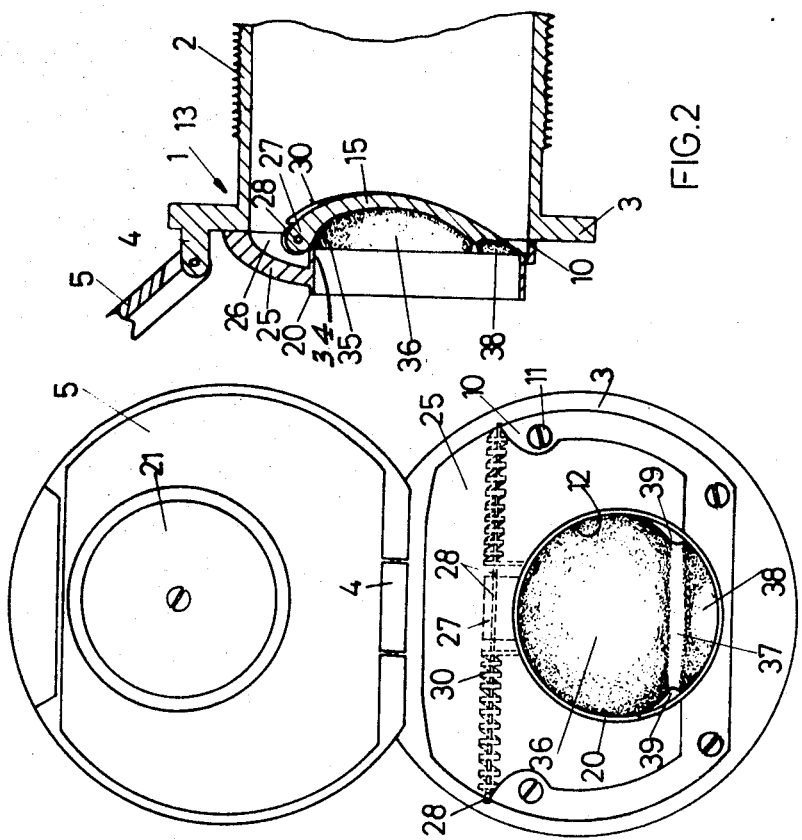
FIG.2
FIG.1

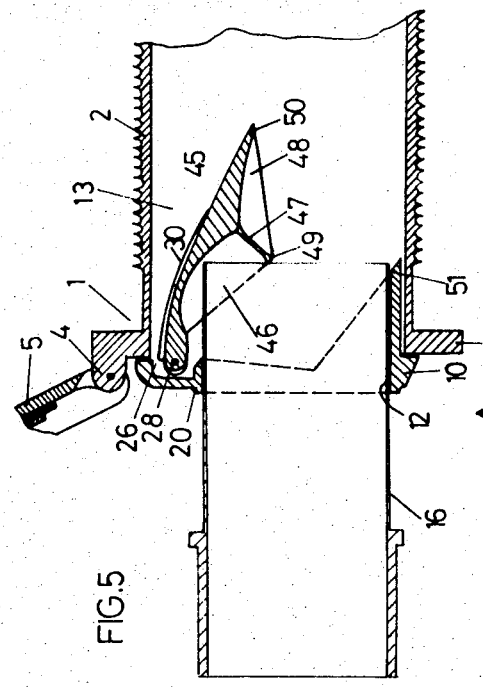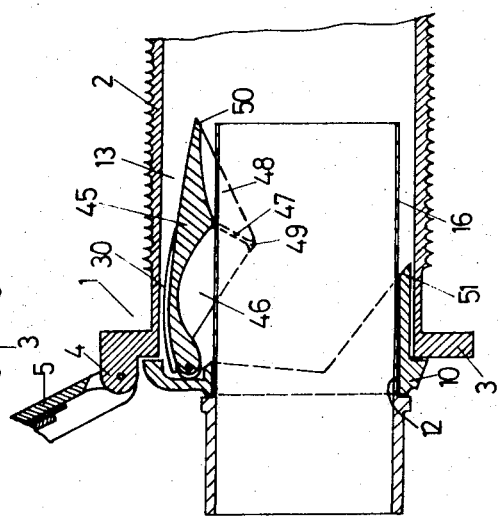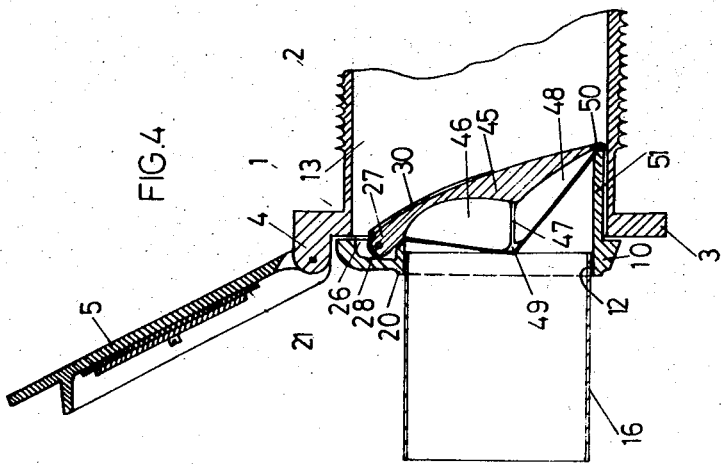

VALVE FOR A CENTRAL SUCTION SYSTEM

BACKGROUND OF THE INVENTION

The present invention refers to so-called silent valves such as used for connecting various types of suction apparatus, in particular vacuum cleaners but also carpet beaters, floor treating apparatus and the like, to a central suction system or the like.

During recent years central suction systems have been installed to a very great extent, in particular in hospitals and other nursing homes but also in ordinary living and office houses. Such a central system for dust removal, for example, comprises conduits extending behind the wall surfaces and provided with connection boxes in various rooms, a power-driven device for providing the necessary suction and a dust collecting device.

In the construction of such connection boxes it is an essential factor to obtain satisfactory sealing when an apparatus is connected to the connection box. It is also of importance that the connection is performed without causing an objectionable hissing or fussing sound to be produced due to the air which during attachment of an apparatus is sucked into the box past the connector which is inserted therein. It is also important that air is prevented from flowing in a backward direction out of the connection box in case of failure of the apparatus for producing the vacuum in the system.

Valves of the type here in question are normally provided with an outer lock definitely preventing penetration of air by suction into the system also in case the valve provided within the box does not close tightly. However, when the cap is opened for the insertion of a connector, the valve provided within the box must definitely provide a tight closure because otherwise a very objectionable hissing sound and at worst an undue reduction of the negative pressure in the system may appear. In respect thereto, the valves in the box have always been so constructed as to close under the action of the negative pressure prevailing in the system.

However, valves of this type cannot be opened by direct action of a connector inserted into the box on the movable valve element, instead the construction requires the provision of an opening mechanism indirectly operated by the connector. Moreover, valves of this type often are subjected to the inconvenience that the valve mechanism restricts the free area of the insertion passage for the connector in the box. Suction conditions, therefore, are unfavourably influenced and there is also some risk that dirt may collect within the box on protruding portions of the valve mechanism. Moreover, these known valves in many cases are of such a length that difficulties may arise when the boxes are to be built into walls of reduced thickness.

Accordingly, during recent years a valve has been designed in which a valve element is biased against the action of the reduced pressure prevailing in the duct from the interior of the duct and outwardly to a position in closing and sealing abutment to the inner wall of the duct or a seat inserted therein. Fundamentally, this construction permits such a design of the valve element that it may be swung to the opening position by direct shifting action from the connector during insertion thereof into the box. Moreover, the construction offers the advantage that the valve element in the opening position completely uncovers the area of the flow duct whereby optimum flow conditions through the box are obtained. Moreover, this construction permits a very short building-in length.

Obviously, in this construction it is necessary that in order to avoid an opening of the valve under the action of the reduced pressure prevailing in the suction conduit the bias of the valve towards the closing position must be comparatively strong, which entails a strong resistance against the insertion of the connector. In order to eliminate this drawback it has been suggested to dispose the valve flap obliquely from the pivoting point towards the interior of the duct. Hereby, a favourable angle of engagement is obtained between the edge of the connector and the outer surface of the valve flap so that in spite of a comparatively strong bias of the valve flap towards the closing position the rather strong resistance offered upon the first contact between the connector and the valve flap quickly decreases during penetration of the connector past the flap. In spite of this, the high initial resistance during the initial engagement between the edge of the connector and the outer surface of the valve flap is an inconvenience which to a considerable extent is caused by unfavourable lever action due to the fact that the place of the engagement is positioned close to the pivot point of the flap.

SUMMARY OF THE INVENTION

The present invention eliminates this drawback in a valve for closing an insertion duct for a connector in a wall- or floor-mounted connection box in relation to a conduit communicating with the duct in the box and forming a part of a central suction system or the like. Such a valve includes a valve flap positioned in the path of insertion of the connector into the duct and pivoted within the box laterally of the insertion path. This flap is biased, against the action of a reduced pressure prevailing in the duct, from the interior of the duct outwardly into a final position in a closing and sealing abutment against a seat bounding an insertion opening for the connector. The valve flap, in accordance with the invention, is concave on its surface facing outwardly from the duct within an edge portion corresponding to the seat and is provided with at least one shoulder extending from the edge portion within the plane of the seat into the insertion path of the connector. This shoulder of the valve flap is adapted to be in force-transmitting engagement with a forward portion of the connector during a considerable part of the inserting movement of the connector through the insertion opening.

By this construction a wearing frictional engagement between the edge of the connector and a portion of the outer surface of the valve flap near the pivot point is replaced by a combined turning and sliding engagement between a portion of the flap more remotely spaced from the pivot point and the opposed portion of the forward edge of the connector.

It is possible to arrange the shoulder diametrically opposite to the pivot point, however, in which case a very deep concave depression is required on the outer surface of the valve flap in order that the portion of the connector disposed adjacent the pivot point of the valve flap shall not come into contact with the outer surface of the valve flap. In a preferred embodiment of the present invention the shoulder is provided between the pivot point and the diametrically opposed point and closer to the latter point.

In order to obtain a balanced operation of the valve flap it is preferred that two shoulders are provided symmetrically on either side of the pivot point. In this arangement it is suitable that the shoulders form the end portions of a ridge which mutually delimits two concave depressions in the side of the valve flap facing outwardly from the duct. This ridge has such a curvature that in the opening position to which the valve flap has been brought by the insertion of the connector the ridge extends concentrically or, in the direction of insertion of the connector, in parallel to a corresponding edge section of the inserting opening for the connector within the seat.

In systems of the type here in question the connection box normally has the shape of a tube which at the end facing outwardly from the duct is provided with a flange permitting attachment to the wall and supporting an outer locking cap. In connection with such a box a valve according to the present invention is suitably provided with an annular seat portion adapted to be attached to the outside of the flange and bounding the insertion opening. The valve flap is journalled on the inner surface of the seat portion for pivotal movement about an axis extending in a plane perpendicular to the direction of insertion of the connector. This construction enables the entire valve mechanism to be removed and exchanged as a unit from outside the box.

The invention is more closely described by reference to the attached drawings showing two embodiments of a valve according to the invention.

BRIEF DESCRIPTION OF THE DRAWINGS

FIG. 1 shows a box containing a valve and having a locking cap shown in the lifted position seen from the outer wall surface.

FIG. 2 shows a portion of the same box, locking cap and valve in a section perpendicular to FIG. 1.

FIG. 3 is a similar representation of the box with its valve opened by insertion of a connector.

FIGS. 4, 5 and 6 show a second embodiment of a valve in a box of the same type as in the first embodiment, the Figures showing three different engaging positions between a connector inserted into the box and the valve flap.

DESCRIPTION OF THE PREFERRED EMBODIMENTS

The box 1 which is intended to be built into a wall comprises a section of tubing 2 which may be threaded on the outer surface for attachment purposes and a flange 3 attached to the end of the tube section. At an upper portion in the intended position of use the flange 3 is provided with a protrusion 4 extending perpendiculary from the flange, a locking cap 5 being pivotally journalled on said protrusion. In the drawings locking cap 5 is illustrated in an uplift position in which the inserting opening in the box and the valve mechanism of the box are exposed.

A mounting plate 10 is attached by means of four screws 11 on the side of the flange facing outwardly from the tube. An insertion opening 12 for a connector, for example the coupling piece of a vacuum cleaner hose, extends through the mounting plate 10. The opening 12 is eccentrically displaced in relation to the longitudinal center line of tube 2 so that a cavity 13 is formed between the inner wall of tube 2 adjacent the protrusion 4 and the path of insertion of the connector through the opening 12, said cavity serving to receive a valve element 15 in its opening position in which it is pivotally displaced in an inward direction due to the penetration of a connector 16.

Around the opening 12 the mounting plate 10 is provided with a raised edge 20. Locking cap 5 is provided on its inner surface with a sealing disk 21 having slightly larger diameter than the raised edge 20 surrounding opening 12. When the locking cap 5 is closed the sealing disk 21 will be in contact with edge 20. If for some reason the valve mechanism proper in the box does not close tightly the sealing disk 21 will be sucked against the annular edge 20 and will prevent air from penetrating into the suction system thereby causing objectionable noise. Locking cap 5 may of course be spring-biased towards the closing position so that the sealing disk 21 already normally will be in sealing contact with the edge portion 20 around opening 12.

At its upper end and side portions, mounting plate 10 has raised portions 25 forming corresponding cavities on the inner face of the mounting plate. In the inner cavity 26 formed in the upper portion of the mounting plate, i.e. adjacent the attachment protrusion 4, the journalling and biasing mechanism for valve flap 15 is provided. At the pivoted end, valve flap 15 is provided with a pivot portion 27 through which extends journal shaft 28 in a plane perpendicular to the direction of introduction of the connector. At its ends, shaft 28 is supported in edge portions of the raised upper portion 25 of the mounting plate. Between the mounting plate 10 and the journal portion 27 of the valve flap, there is provided at least one biasing spring 30 which at its one end abuts against the rear face of the valve flap and at the other end is attached to the mounting plate. In the embodiment shown, two coil springs 30 are provided each surrounding a corresponding section of shaft 28.

As far as the parts of the box and the valve mechanism described so far are concerned, there is full agreement between the embodiments according to respectively FIGS. 2 and 3 and FIGS. 4 to 6. Differences exist between the two embodiments only in respect to the shape of the valve flap and the valve seat provided on the mounting plate 10.

In the embodiment according to FIGS. 2 and 3, the valve flap 15 proper has a substantially circular edge portion 35 intended to come into sealing contact with an opposed seat 34 on the mounting plate, this seat being provided on the inner surface of the mounting plate 10 around opening 12.

Within edge portion 35 on the side of the valve flap facing outwardly from the insertion duct, valve flap 15 is concave so that a distinct depression 36 immediately extends from edge portion 35 along practically the whole extension of said edge portion. In the lower portion of valve flap 15, i.e. the part spaced from the shaft, a raised ridge 37 extends in the direction of the shaft, said ridge delimiting from the concave depression 36 a smaller depression 38 at the end of valve flap opposite to shaft 28. At both ends, ridge 37 merges into edge portion 35 in a gentle transition whereby on either side there is formed one shoulder 39 each which in the plane of edge portion 35 slightly extends into the insertion duct within opening 12. The ridge 37 itself is inwardly curved between shoulders 39 in an arc approximately corresponding to the curvature of the inserting opening and the connector respectively.

When a connector having a diameter corresponding to opening 12 and a circular forward edge is inserted into the above described valve mechanism, the edge portion positioned uppermost during insertion of the connector 16, in contradistinction to previously known constructions, will not come into engagement with valve flap 15 which at this position is provided with depression 36. On the other hand, an edge portion of the inserted connector spaced from the shaft of the valve flap will contact shoulders 39 and by this engagement will turn flap 15 from the position shown in FIG. 2 to the position shown in FIG. 3. During the final phase of the insertion of the connector 16 the engagement between the edge portion of the connector and the shoulders 39 will take place at increasingly higher positions of the edge portion of connector 16. When the edge portion has reached a position adjacent ridge 37 flap 15 will be supported on the periphery of the connector at the end thereof substantially along the whole extension of ridge 37 between shoulders 39. During the subsequent final phase of the insertion of the connector 16 this relative position between the ridge 37 and the connector 16 will be maintained until the upper edge portion of connector 16 from the inside will contact the bottom of the concave depression 38 adjacent the edge portion 35 at its greatest spacing from the pivotal point of flap 15. During the final phase of the inserting movement, an additional lifting of flap 15 will thereby take place until in the final position shown in FIG. 3 the part of edge portion 35 diametrically opposite shaft 28 will be supported on the outer surface of connector 16, while at the same time ridge 37 extends at a slight distance around the outer surface of connector 16.

Under the rather acute angle of contact between the outer surface of the connector and the edge portion of valve 15 spaced from shaft 28 during the final phase of the inserting movement the frictional stresses on the edge portion 35 at this place will not become excessive. In spite of this, after an extended period of use, a certain wear of the edge portion may take place and thereby a certain deterioration of the sealing engagement between the edge portion and the opposed seat on the inner surface of mounting plate 10. This drawback is eliminated in the embodiment of the object of the invention shown in FIGS. 4 to 6.

Valve flap 45 in this embodiment is substantially similar to valve flap 15 according to the first described embodiment in respect to the way in which the flap is journalled on a shaft 28 extending through an outer journal portion 27 on the flap, the shaft in turn being supported in the mounting plate 10, specifically within cavity 26 in the upper part of the raised portion 25. In the same way as in the first embodiment, the biasing means for the valve flap are constituted by at least one spring 30 abutting against the rear surface of valve flap 45 and engaging the mounting plate 10 at its free end. Also here one coil spring 30 each may be provided around either part of shaft 28 on either side of journal portion 27.

The essential difference between valve flap 45 in the embodiment according to FIGS. 4 to 6 and valve flap 15 according to the previously described embodiment resides in the fact that ridge 47 and shoulders 49 are disposed nearer shaft 28 than in the first embodiment which means that depression 46 occupies a lesser portion of the forward face of the valve flap than depression 36 in the first embodiment. Below ridge 47 a lower depression 48 is formed within the range of which both the edge portion 50 of the valve flap and a corresponding portion of the seat are inclined in the direction towards the interior of the duct in relation to the sections of the edge portion and the seat within the range of the concave depression 46 disposed more closely to the journal shaft 28.

It appears from FIGS. 4 to 6 that seat 51 seen in transverse section has a contour comprising an upper portion within the range of depression 46 which is slightly outwardly inclined from a position adjacent shaft 28 and which on the level of the ridge on the valve flap diverges in a direction inclined towards the interior of the duct. Of course, the purpose of this construction is to position shoulders 49 most forwardly of the valve flap in the direction towards a connector being inserted into the box while at the same time, due to the inclination of the valve flap and the corresponding seat in an inward direction, every engagement between the connector and any part of edge portion 50 of the valve flap 45 during the entire inserting movement will be avoided.

In FIG. 4 there is shown the first contact of the connector with shoulders 49. FIG. 5 illustrates the lifting of valve flap 45 by cooperation of the shoulders with successively higher sections of the forward edge of the connector 16. When the upper corner of connector 16 has reached and passed ridge 47 the flap will be supported in substantially the entire extension of ridge 47 between shoulders 49 on the outer surface of the connector. In the embodiment according to FIGS. 4 to 6 there is thus obtained a frictional engagement between the inserted connector 16 and the portions of valve flap 45 cooperating therewith, which engagement does not produce any wear of certain sections of edge portion 50 so that the cooperation of the edge portion with seat 51 thus is not impaired even after extended use of the device. In spite of this favourable effect there is no need to increase the size of cavity 13 adapted to receive the valve flap in the opening position in comparison with the previously described embodiment because the side portions of the valve flap will straddle the outer surface of the connector as clearly shown in FIG. 6.

It is characteristic of all embodiments of the valve according to the invention that during extraction of the connector the valve flap under the action of its spring will jump back with a quick movement to the closing position and thereby expel the connector from the interior of the box as soon as the forward edge of the connector by an initial manual extraction movement has been moved to a position past the shoulders in the direction towards the mouth of the box. Thus, there will be no objectionable sound by inspiration of outside air during the detachment of the connector.

It is of course possible to modify the shape of the valve flap and the seat in many respects within the basic principle of the invention which does not either exclude certain contact between a portion of the edge of the connector and the bottom of the dish-like depression on the outwardly facing side of the valve flap during engagement of the connector with the flap.

What we claim is:

1. A valve for closing an insertion duct for a connector in a built-in connection box in relation to a conduit communicating with the duct in said box and forming a part of a central suction system, said valve comprising a valve flap positioned in the path of insertion of the connector into the duct and pivoted within the box laterally of the insertion path, said flap being biased, against the action of a reduced pressure prevailing in the duct, from the interior of the duct outwardly into a final position in closing and sealing abutment against a seat surrounding an insertion opening for the connector, characterized in that said valve flap has an edge portion corresponding to said seat, that within said edge portion said valve flap is concave on its surface facing outwardly from the duct and that said valve flap is provided with two shoulders symmetrically provided on either side of the pivot point and extending from said edge portion within the plane of the seat into the insertion path of the connector to come into force-transmitting engagement with a forward portion of the connector during a considerable part of the inserting movement of the connector through the insertion opening.

2. The valve as claimed in claim 1 in which the shoulders are spaced from the pivot point of the valve flap.

3. The valve as claimed in claim 2 in which the shoulders are disposed between the pivot point and the diametrically opposed position and more closely to the latter position.

4. The valve as claimed in claim 1 in which the shoulders form the end portions of a ridge which mutually delimits two concave depressions in the side of the valve flap facing outwardly from the duct.

5. The valve as claimed in claim 4 in which the depression situated more closely to the pivot point comprises a greater portion of the surface of the valve flap within edge portion than the other depression.

6. The valve as claimed in claim 4 in which the ridge has such a curvature that in the open position to which valve flap has been moved by the insertion of the connector the ridge extends concentrically or, viewed in the inserting direction of the connector, parallel to a corresponding edge portion of the inserting opening for the connector in the seat.

7. The valve as claimed in claim 4 in which within the range of the concave depression disposed at a greater distance from the pivot point both the edge portion of the valve flap and the corresponding portion of the seat starting from the shoulders are more inclined towards the interior of the duct in than the sections of the edge portion and the seat within the range of the concave depression disposed more closely to the pivot point.

8. The valve as claimed in claim 1 in which said concave depression adjacent the pivot point has such a shape that at least during a considerable part of the inserting movement of a connector having a forward edge positioned in a plane perpendicular to the path of insertion a force-transmitting engagement between said forward edge and the valve flap substantially only exists at the shoulders.

9. The valve as claimed in claim 1 in which for use in a box having the shape of a tube which at the end facing outwardly from the duct is provided with a flange radially extending from the tube opening, said valve comprising a mounting plate adapted to be attached on the outer surface of said flange and bounding the insertion opening at an annular seat, the valve flap being journalled on the inner surface of said mounting plate for swinging displacement on a shaft extending in a plane perpendicular to the direction of insertion of the connector.

10. The valve as claimed in claim 9 in which the valve flap has a journal portion extending exteriorly of the edge portion corresponding to the seat, said shaft extending through said journal portion in a plane perpendicular to the direction of insertion of the connector and being supported on either side of the journal portion in the side of the mounting plate facing the interior of the box.

11. The valve as claimed in claim 9 in which means biasing the valve flap against the seat are provided on the side of mounting plate facing the interior of box adjacent said journal portion.

* * * * *